(12) United States Patent
Westphal et al.

(10) Patent No.: US 7,416,313 B2
(45) Date of Patent: Aug. 26, 2008

(54) ASSEMBLY FOR ILLUMINATING OBJECTS WITH LIGHT OF DIFFERENT WAVELENGTHS

(75) Inventors: Peter Westphal, Jena (DE); Daniel Bublitz, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 189 days.

(21) Appl. No.: 10/551,265

(22) PCT Filed: Mar. 9, 2004

(86) PCT No.: PCT/EP2004/002388
§ 371 (c)(1),
(2), (4) Date: Sep. 28, 2005

(87) PCT Pub. No.: WO2004/086117
PCT Pub. Date: Oct. 7, 2004

(65) Prior Publication Data
US 2006/0187542 A1    Aug. 24, 2006

(30) Foreign Application Priority Data
Mar. 28, 2003   (DE) ................ 103 14 125

(51) Int. Cl.
   *F21V 21/14*   (2006.01)
(52) U.S. Cl. ............................ 362/250; 362/800
(58) Field of Classification Search ............. 362/427, 362/362, 800
   See application file for complete search history.

(56) References Cited

U.S. PATENT DOCUMENTS 4,292,663 A * 9/1981 Martino et al. ............... 362/97
4,555,749 A * 11/1985 Rifkin et al. ................. 362/249
4,852,985 A * 8/1989 Fujihara et al. .............. 359/387
5,491,343 A    2/1996 Brooker
6,154,282 A    11/2000 Lilge et al.
6,386,743 B1 * 5/2002 Futami et al. ................ 362/516
6,428,172 B1 * 8/2002 Hutzel et al. ................ 359/838

(Continued)

FOREIGN PATENT DOCUMENTS

| DE | 199 19 096 A1 | 11/2000 |
| DE | 100 17 823 A1 | 10/2001 |
| DE | 100 30 772 A1 | 10/2001 |
| JP | 2002350732 A | 12/2002 |
| WO | WO 96/37797 | 11/1996 |
| WO | WO 01/61324 A1 | 8/2001 |

*Primary Examiner*—Tho D. Ta
*Assistant Examiner*—Travis Chambers
(74) *Attorney, Agent, or Firm*—Patterson, Thuente, Skaar & Christensen, P.A.

(57) ABSTRACT

The invention relates to an assembly for illuminating objects with light of different wavelengths in microscopes, automatic microscopes and devices for fluorescent microscopy applications. Said assembly comprises LED light sources for illuminating the objects, which are positioned in the illumination beam path of the microscope or device. A receiving element (6; 13) that can be rotated about a rotational axis (5) is provided with respective fixing elements (7) for at least one LED (3; 3.1). The receiving device (6; 13) is situated in a housing (1) that can be placed on or positioned in the device housing (18). A drive unit (9) for the defined adjustment of the receiving device (6; 13) is provided in such a way that the LED (3; 3.1) can be positioned in front of a light emission opening of the housing (1) with the respective focal point wavelength that is required for measuring and/or observation purposes.

16 Claims, 2 Drawing Sheets

U.S. PATENT DOCUMENTS

| | | |
|---|---|---|
| 6,663,260 B1 * | 12/2003 | Tieszen ...................... 362/249 |
| 6,758,573 B1 * | 7/2004 | Thomas et al. .............. 362/133 |
| 6,795,239 B2 | 9/2004 | Tandler et al. |
| 6,856,727 B2 * | 2/2005 | Li ................................ 385/31 |
| 6,924,930 B2 | 8/2005 | Uhl |
| 2003/0147254 A1 * | 8/2003 | Yoneda et al. .............. 362/551 |

* cited by examiner

ASSEMBLY FOR ILLUMINATING OBJECTS WITH LIGHT OF DIFFERENT WAVELENGTHS

FIELD OF THE INVENTION

The invention relates to an arrangement for illuminating objects with light of different wavelengths in microscopes, automatic microscopes, and equipment for fluorescent microscopy applications, e.g. in readout equipment for titer plates and biochip readers.

BACKGROUND

In wide-field fluorescent microscopy, halogen or arc lamps are generally used as sources of white light in combination with spectral filters in order to bring electromagnetic radiation of suitable wavelengths for observation or measurement onto an object to be examined or onto a specimen to be examined. However, such sources of white light have a brief service life, so that the light source must frequently be changed. These light sources are also characterized by the development of a good deal of heat, which can have unfavorable effects on the observations and measurements. Furthermore, the spectral portions in the light sources that are not used must to a great extent be suppressed in some manner. An additional disadvantage of these light sources is that it is not possible to turn them on and off rapidly, because the light sources tend to have an afterglow.

Light sources with a light output of greater than 100 mW, which is adequate for wide-field fluorescent microscopy, are known and available. These are primarily color LEDs with a spectral half-width value of approximately 20 to 50 nm. However, there are also white light LEDs that have spectral maximums in the blue and green range of the spectrum. The outputs of color LEDs are comparable to the light output that a halogen or arc lamp has after spectral filtering to approximately 20 to 60 nm bandwidth of the excitation light.

For visual illumination purposes in microscopy, it is the state-of-the-art to overlay three or more LEDs on different wavelengths (RGB light sources) in order to obtain white light, e.g. for projection purposes.

DE 100 17 823 A1 describes a microscopic illumination apparatus with a light source embodied as a light diode arrangement. This diode arrangement can comprise white light diodes or even infrared light diodes and can be embodied such that different types of illumination, such as incident illumination, transmitted light illumination, or combined illumination of the objects to be examined can be realized. It is also possible to attain "oblique" illumination of the object.

The disadvantage of this illumination device is that there is no provision for turning on and placing different LEDs in the illumination ray path of the microscope.

SUMMARY

The object of the invention is to create a light source arrangement, in particular for fluorescent microscopes, that permits rapid and precise positioning of LED radiation sources that emit light of the same and/or different wavelengths one after the other in the illumination ray path of a microscope.

This object is inventively attained in an arrangement embodied in accordance with the preamble with the characterizing means of the first claim. Additional designs and details of the invention are disclosed in the subordinate claims. The receiving apparatus is advantageously embodied as a rotary table that is rotatable about the axis and on which the mounts are provided.

In accordance with a first embodiment of the inventive arrangement, it is advantageous when the mounts are embodied and arranged on the receiving apparatus and are attached to the receiving apparatus such that the main emission direction of the at least one LED arranged thereon runs parallel to the axis of rotation.

In accordance with another embodiment of the invention, it can also be advantageous that the mounts of the receiving apparatus are embodied and arranged on the receiving apparatus such that the emission direction of the at least one LED arranged thereon runs radial to the axis of rotation.

In order to bundle or align the radiation generated by the LEDs and/or homogenize it, collimator optics and/or a radiation homogenizer known in the field per se are provided in the equipment housing in the light direction downstream of the light emission window of the housing.

In order to cover gaps in the spectrum of the light that are not covered by single-color LEDs, it is furthermore advantageous when at least one of the LEDs is a white light-emitting LED (white light LED).

So that the LED used can be operated with higher current and thus a higher light yield can be attained, a Peltier cooling element for cooling the LED is provided arranged between the mount of the receiving apparatus and the LED arranged thereon.

For certain applications it can also be advantageous that a halogen light source or another light source, e.g. a diode laser, is arranged on at least one mount of the receiving apparatus.

The housing of the arrangement is advantageously detachably affixed to the equipment housing. It is advantageous when the housing is arranged adjustably on the equipment housing, e.g. using a rapid change ring in the form of a dovetail.

It is furthermore advantageous when at least one LED is arranged exchangeably in the mount, e.g. in a suitable plug-in socket. In addition, at least one LED can advantageously be securely joined to the associated Peltier cooling element and can be exchangeably arranged in the mount together therewith. During an exchange, the LED, together with the Peltier cooling element, is then exchanged as a single unit. LED and associated Peltier cooling element can also be detachably joined to one another so that the LED can be exchanged without the Peltier cooling element.

BRIEF DESCRIPTION OF THE DRAWINGS

The invention is explained in greater detail in the following using exemplary embodiments. The drawings are as follows.

DETAILED DESCRIPTION

Elements and components that have the same design and functional purposes in the figures have the same reference numbers in the description of the exemplary embodiments.

Figure 1:
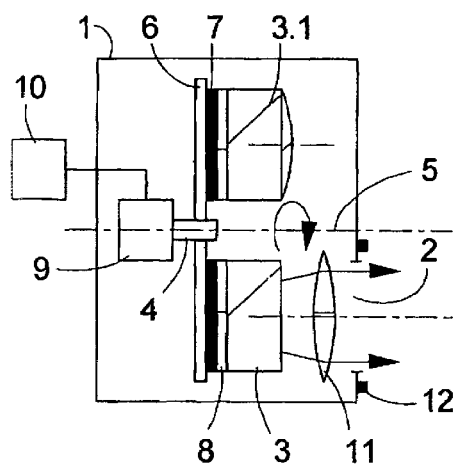
FIG. 1 illustrates an arrangement with a receiving apparatus embodied as a rotary table.

The arrangement for illuminating objects with light of different wavelengths in microscopes, which is illustrated in a simplified fashion in FIG. 1, includes a housing 1 in which is provided a light emission aperture 2 through which the light from LEDs 3 employed as the light source can be introduced into the illumination ray path, e.g. of a fluorescent microscope or readout equipment for titer plates or biochip readers. Arranged in the housing 1 is a receiving apparatus 6 that is arranged on a shaft 4 and that is rotatable about an axis of rotation 5, illustrated in FIG. 1 as a rotary table, that includes mounts 7 to which are attached Peltier cooling elements 8 and the LEDs 3. It is advantageous when the LEDs 3 and the associated Peltier cooling elements 8 are combined in a single unit in order if necessary to be able to exchange them together in a simple manner. The Peltier cooling element 8 is joined to the associated LED 3 so that the LEDs 3 can be operated with a higher current and thus attain a higher light yield. Four LEDs 3; 3.1 are arranged on the receiving apparatus 6 in FIG. 1. In principle, more or fewer LEDs 3; 3.1 can be present there. The LEDs 3; 3.1 and the associated Peltier cooling elements 8 are advantageously mounted to the receiving apparatus 6 by snap or magnetic mounts (not shown) for simple and rapid exchangeability.

For driving the shaft 4, a drive device 9, e.g. a controllable motor, is provided with which the LED 3 with the desired effective wavelength that is required or suitable for illuminating the objects to be examined (not shown) is positioned in a position upstream of the light emission aperture 2 so that the radiation emitted by the LED 3 can be coupled into the illumination ray path of the equipment. The main direction of emission of the LED 3 is parallel to the axis of rotation 5.

For appropriately controlling the drive device 9, a control unit 10 is provided that can be controlled using suitable software. Alternatively, the LEDs 3; 3.1 can also be positioned manually or by manually controlling the drive device 9.

In the embodiment in accordance with FIG. 1, collimator optics 11 for light bundling and where needed a light filter are provided in the direction of light downstream of the light emission aperture 2. In addition, the emission surface of the LEDs 3; 3.1 can be embodied such that a light-collecting effect is attained. Thus the emission surface of the LED body is embodied in the shape of the lens, as shown in FIG. 1 for the LED 3.1.

Advantageously, in the area of the housing 1 in which the light emission aperture 2 is located, a receiving flange 12 is provided on the housing 1 of the arrangement and includes elements that facilitate rapid attachment of the arrangement to the equipment housing 18.

Figure 2:
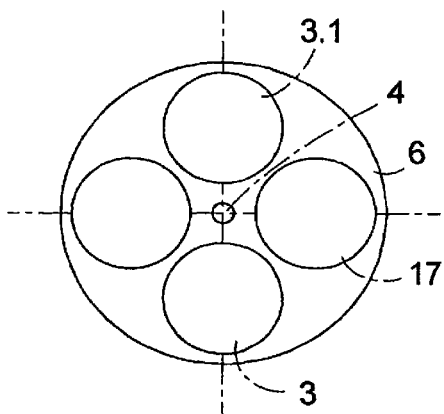
FIG. 2 is a top view of the rotary table with the LEDs arranged thereon.

FIG. 2 is a top view of the receiving apparatus 6 embodied as a rotary table on which are arranged four LEDs 3; 3.1.

Figure 3:
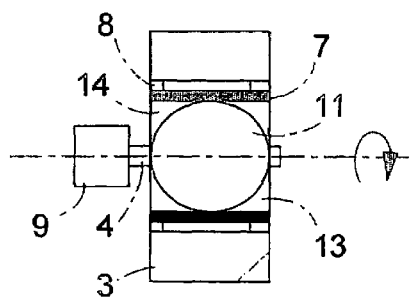
FIG. 3 illustrates an arrangement with a receiving apparatus in which the mounts are arranged radial to the axis of rotation.
Figure 4:
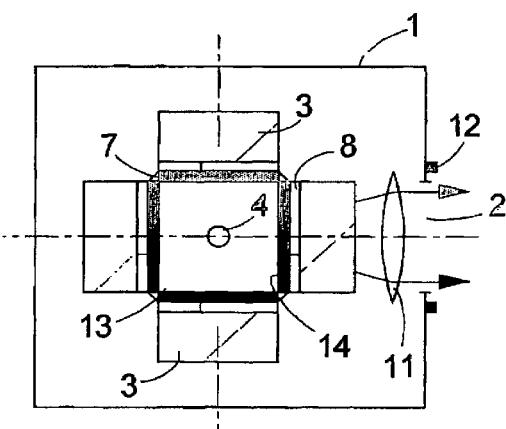
FIG. 4 is a top view of the rotatable receiving apparatus.

FIG. 3 and FIG. 4 illustrate different views of an inventive arrangement with a prismatic receiving apparatus 13, arranged on the shaft 4 driven by the drive device 9, on each of the four circumferential surfaces 14 of which are arranged mounts 7, Peltier cooling elements 8, and the LEDs 3 in a manner analogous to that in the arrangement in accordance with FIG. 1 and FIG. 2. The main emission direction of the LEDs 3 in this embodiment is radial to the axis of rotation 5. Instead of four LEDs 3, more or fewer LEDs can also be provided given appropriate design of the prismatic receiving apparatus 13.

Thus, in this arrangement as well, a mount 7, a Peltier cooling element 8, and the corresponding LED 3 are positioned in series on each circumferential surface 14 of the prismatic receiving apparatus 13. The collimator optics 11 that are associated with the light emission aperture 2 are located in the housing 1 of the arrangement. In this case, as well, the drive device 9 is controlled by the control unit 10.

Figure 5:
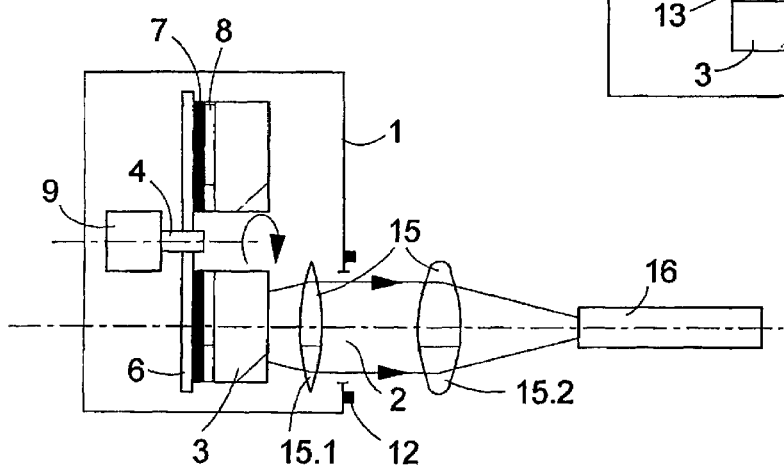
FIG. 5 is an arrangement in which collimator optics and a light homogenizer are provided; and, FIG. 6 illustrates how the arrangement is attached to the equipment housing.

FIG. 5 is an exemplary illustration of the arrangement depicted in FIG. 1 and FIG. 2 in connection with elements that shape and homogenize the light bundle emitted by the LED 3 through the light emission aperture 2. Thus, a radiation homogenizer 16 is downstream in the direction of light of collimator optics 15 that constitute a plurality of components in this embodiment. A glass or plastic rod acting as a light guide, a hollow rod with a mirrored interior surface, or a light guide filled with liquid that has a round or polygonal cross-section can be provided as radiation homogenizer 16, for instance.

The individual LEDs 3 are preferably selected such that their emitted light has a spectrum that is well matched to the absorption spectra of frequently used fluorophors such as FITS, Cy3, Cy5, APC, etc.

In order to cover gaps in the spectrum of the LEDs 3 during observations and measurements, at least one of the LEDs 3 can be replaced with a white light source 17 (FIG. 2). Preferably a white-light LED that radiates a white light can also be employed. Alternatively order in addition thereto, an LED position can also be fitted on the mount 7 with a halogen light source 17, e.g. a halogen lamp with a reflector.

Figure 6:
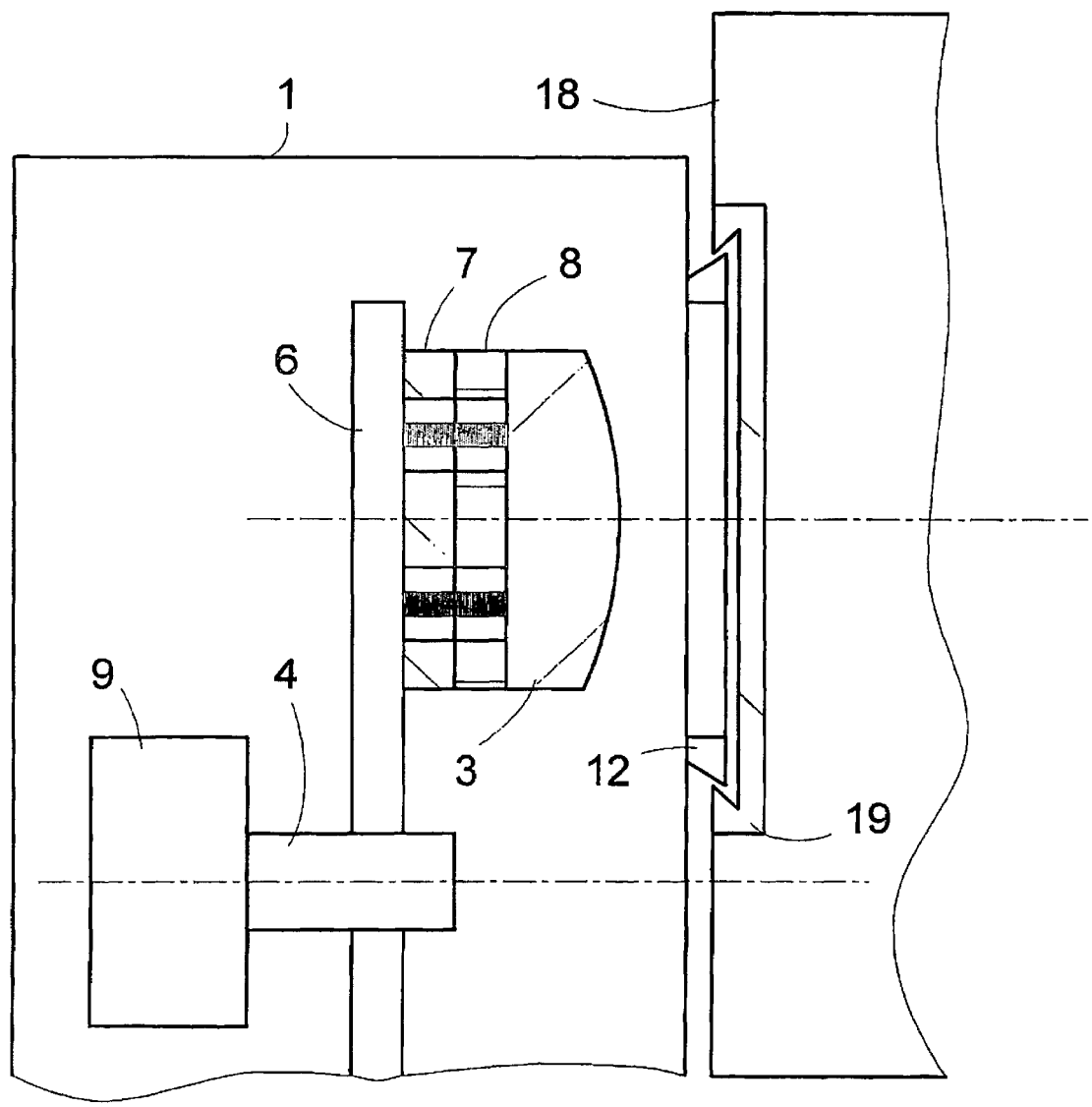

FIG. 6 illustrates a preferred simple attachment of the housing 1 of the arrangement to the equipment housing 18 of the microscope or readout equipment. A rapid change ring, e.g. in the form of a dovetail, is provided that comprises the receiving flange 12 arranged on the housing 1 and the counter-piece 19 that is arranged on the equipment housing 18 and that cooperates with the flange 12. This connection makes it possible to rapidly change the entire arrangement.

LEGEND

1 Housing
2 Light emission aperture
3 LED
3.1 LED with collecting lens
4 Shaft
5 Axis of rotation
6 Receiving apparatus
7 Mount
8 Peltier cooling element
9 Drive device
10 Control unit
11 Collimator optics
12 Receiving flange
13 Receiving apparatus
14 Circumferential surfaces
15 Collimator optics
15.1; 15.2 Component
16 Radiation homogenizer
17 Halogen light source
18 Equipment housing
19 Counter-piece

The invention claimed is:

1. Arrangement for illuminating objects with light of different wavelengths in microscopes, automatic microscopes, and equipment for fluorescent microscopy applications comprising LED light sources for object illumination that are arranged in the illumination radiation path of the microscope or equipment, further comprising:

a receiving apparatus that is rotatable about an axis of rotation and that is provided with mounts for each of at least one LED, whereby said receiving apparatus is arranged in a housing that can be attached to an equipment housing or that is positioned in said equipment housing; and a drive device for defined adjustment of said receiving apparatus such that said at least one LED can be selectively positioned upstream of a light emission aperture of said housing with the effective wavelength that is required for measurements and/or observations.

2. Arrangement in accordance with claim 1, wherein said mounts are embodied and attached to said receiving apparatus such that the main emission direction of said at least one LED arranged thereon runs parallel to said axis of rotation.

3. Arrangement in accordance with claim 1, wherein said mounts of said receiving apparatus are embodied such that the main emission direction of said at least one LED arranged thereon runs radial to said axis of rotation.

4. Arrangement in accordance with claim 1 wherein collimator optics and a radiation homogenizer are provided in said equipment housing in the light direction downstream of said light emission aperture of said housing.

5. Arrangement in accordance with claim 1 wherein at least one of said LEDs is a white light LED emitting a white light.

6. Arrangement in accordance with claim 1 wherein a Peltier cooling element for cooling said LED is provided arranged between said mount of said receiving apparatus and said LED arranged thereon.

7. Arrangement in accordance with claim 1 wherein a halogen light source or another light source is arranged on at least one mount of said receiving apparatus.

8. Arrangement in accordance with claim 1, characterized in that said housing is arranged on said equipment housing using a rapid change ring in the form of a dovetail.

9. Arrangement in accordance with claim 1 wherein said at least one LED is arranged exchangeably in said mount without an associated Peltier cooling element.

10. Arrangement in accordance with claim 1 wherein said at least one LED is securely joined to said associated Peltier cooling element and can be arranged exchangeably in said mount together therewith.

11. Arrangement in accordance with claim 1, in combination with a microscope.

12. A light source for microscopes having an illumination ray path, the light source comprising:
   a housing with a light emission aperture alignable with the illumination ray path;
   an LED receiving apparatus rotatably mounted within the housing, the receiving apparatus having an axis of rotation; and
   a plurality of LEDs, the LEDs each having light emission of different spectral characteristics, the LEDs mounted to the receiving apparatus whereby one of the LEDs of the plurality of LEDs can be selectively rotationally positioned upstream of the light emission aperture.

13. The light source of claim 12 wherein each of the LEDs has a main emission direction and wherein said main emission direction of each of the LEDs is aligned with the axis of rotation of the receiving apparatus.

14. The light source of claim 12 further comprising at least one of collimator optics and a radiation homogenizer attached to the housing and placeable in the light emission of the LEDs.

15. The light source of claim 12 further comprising a Peltier cooling element attached to an LED.

16. The light source of claim 12 in combination with a microscope, the light source attached to the microscope.

* * * * *